May 15, 1962 — W. P. KERN — 3,034,615
MOLDING FASTENER
Filed June 24, 1957
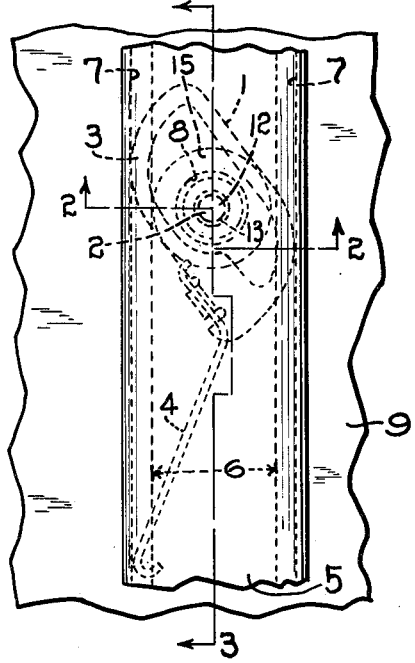
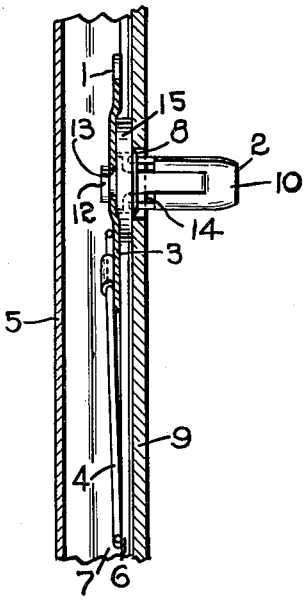
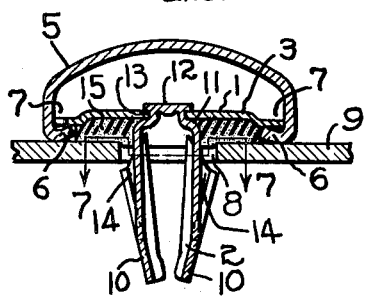
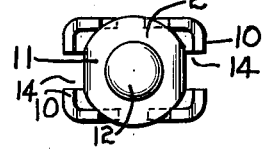
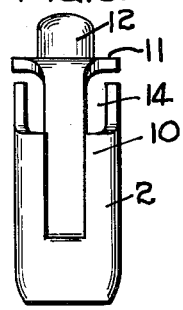
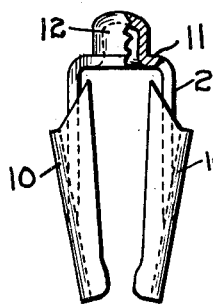
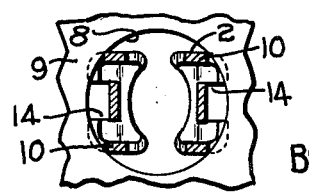
INVENTOR:
WALTER P. KERN,
BY Walter P. Jones
ATTORNEY.

United States Patent Office 3,034,615
Patented May 15, 1962

3,034,615
MOLDING FASTENER
Walter P. Kern, Cohasset, Mass., assignor to United-Carr Fastener Corporation, Cambridge, Mass., a corporation of Delaware
Filed June 24, 1957, Ser. No. 667,566
3 Claims. (Cl. 189—88)

My invention relates to fasteners for attaching moldings, metal trim, and the like to automobiles, aircraft, and other similar installations.

Moldings are frequently made of hollow channeled construction and are provided with inwardly extending spaced flanges adapted to be clamped against a support by the cross-piece of a fastener. Such fasteners are readily mounted in a desired position by inserting the cross-piece between the spaced flanges and then turned so that the ends thereof pass behind the flanges to bear against a portion of the molding, so that the cross-piece is maintained in an inclined position in the molding, with the angle of inclination being greater in the more narrow moldings. Since such fasteners are frequently used in tapered moldings whose width varies along the axis of the molding, the cross-piece may be provided with diagonally opposite corners which are rounded to provide a smooth bearing surface at the ends thereof for such moldings of varying widths.

It is now common practice to attach the fastener to the support by a screw and bolt or by a snap fastener.

The object of the invention is to provide a water-proof molding fastener which is adapted for assembly into a channeled molding having narrow opposing recesses, and to provide a snap fastener portion, rather than a bolt, to hold the molding to a support, the entire fastener also to be sealed against passage of water or mositure when installed.

A further object of the invention is to seal the snap fastener portion in attachment to the molding engaging and holding portion.

Another object of the invention is to provide a flexible seal to prevent passage of water and moisture around the snap fastener portion and through a hole in the support, FIG. 1 is a plan view of a molding installation embodying my invention, parts of the snap fastener and molding being shown on dotted lines;

FIG. 2 is a section on the line 2—2 of FIG. 1;

FIG. 3 is a section taken on the line 3—3 of FIG. 1, the sealing washer and part of the fastener being shown in elevation;

FIG. 4 is a plan view of the snap fastener portion of the molding fastener prior to assembly with the molding engaging and holding portion;

FIG. 5 is an elevational view of the fastener shown in FIG. 4;

FIG. 6 is another elevational view (partly in section) of the fastener shown in FIG. 4, and FIG. 7 is a section taken on the line 7—7 of FIG. 2.

Referring to the drawing, there is illustrated a molding and like fastener having a molding engaging and holding portion 1 and a support engaging snap fastener portion 2. The construction of these portions 1 and 2 may vary without departing from the scope of my invention. However, I shall describe one specific embodiment of my invention as shown in the drawings.

The fastener illustrated comprises generally molding-engaging portion 1 and snap fastener portion 2 particularly adapted for assembly with moldings of various widths, or into a tapered molding in which the width varies throughout the length thereof. The molding-engaging portion 1 comprises generally a cross-plate 3 and a cantilever spring 4 attached thereto. The cross-plate 3 has a length which is greater than the width of the molding 5 and a width less than the distance between the inturned edges 6, whereby the cross-plate may be inserted between the inturned edges and rotated until the ends thereof pass into the opposing recesses 7. Thus the ends bear against the molding, so that the cross-plate is maintained in an inclined position in relation to the axis of the molding, as shown in FIGS. 1, 2 and 3. The angle of inclination of the cross-plate from the transverse axis of the molding, as measured by a line drawn between the points of contact of the ends thereof with the molding, will vary with the width of the molding, and will be greater with narrower moldings.

The snap fastener portion 2 may be of any suitable construction that will snap through an aperture 8 in a supporting structure 9 and the two parts of the fastener may be secured together by a rivet extending from one of the parts through an aperture in the other part of the fastener and riveted to close the aperture to prevent the passage of water and moisture at that point of the fastener construction. One specific form of my snap fastener portion 2 is shown in FIGS. 4, 5, and 6 and is formed from sheet metal to provide yieldable leg portions 10 extending from a base portion 11. In this connection I have shown a hollow closed rivet 12 drawn from the material of the base 11 as illustrated.

In the particular construction of my improved fastener the rivet 12 extends through an aperture 13 (FIGS. 2 and 3) and is riveted tightly in place to close the aperture 13. Since the preferred embodiment of my improved fastener has a snap fastener portion 2 with yieldable leg portions 10, there are also spaces 14 between the leg portions 10 through which water and moisture could pass through the aperture 8 and into the molding. To overcome this I include as a part of the fastener assembly a flexible washer 15 (FIGS. 2 and 3) which cooperates with the closed rivet 12 to overcome the passage of water and moisture.

In the particular assembly of my invention as illustrated in FIGS. 1, 2, and 3, it will be noted that the molding engaging and holding portion engages the flanges 6 of the molding 5 and the snap fastener portion 2 passes through the aperture 8 and engages the underside of the support 9 thereby drawing the parts of the installation together tightly. It will be noted that the flexible washer 15 is then compressed tightly against the same side of the support 9 as the molding 5 and extends slightly into the aperture 8 thereby completely closing the aperture around the outside of the snap fastener portion. Thus, when water or moisture makes an attempt to pass through the spaces 14 in the snap fastener portion 2 and the support into the molding, such passage is prevented by the combined efforts of the flexible washer 15 and the tightly riveted closed end hollow rivet 12.

While I have illustrated and described a preferred embodiment of my improved fastener and installation, I do not wish to be limited thereby because the scope of my invention is best defined by the following claims.

I claim:

1. A molding fastener comprising a molding engaging and holding cross plate having an opening therein, a snap fastener portion assembled with said cross plate in substantially transverse relationship thereto and adapted to engage a support for the molding, said snap fastener portion having a closed rivet integral therewith at one end thereof and extending through the opening in said cross plate and riveted to the top surface thereof to fill the opening in the cross plate and to prevent the passage of water and moisture therethrough while holding the two elements of the molding fastener in assembly, said snap fastener portion having spaced, resilient leg portions at the other end thereof for engagement with a support.

2. A molding fastener comprising a molding engaging and holding cross plate having an opening therein, a snap fastener assembled with said cross plate in transverse relationship thereto and adapted to engage a support for the molding, said snap fastener comprising a base portion in flat surface engagement with the under surface of said cross plate immediately surrounding the opening therein, a closed end rivet portion extending from said base portion in transverse relationship thereto through the opening in said cross plate, said rivet portion being riveted to the top surface of said cross plate to fill the opening therein and to prevent the passage of water and moisture therethrough while holding the cross plate and the snap fastener in assembly, and resilient, spaced leg portions extending from the opposite side of said base portion in transverse relationship thereto for engagement with a support.

3. A molding installation comprising in combination an elongated, hollow molding member having spaced, parallel, free edges thereof having inturned flanges, an apertured support for the molding and a fastener element holding the molding to the support, said fastener element comprising a molding engaging and holding cross plate member engaging inturned flanges of said molding, a snap fastener element extending from the molding engaging and holding cross plate member and snapped through the aperture in said support, said snap fastener member comprising a base portion in flat surface engagement with the under surface of said cross plate member immediately surrounding the opening therein, a closed end rivet portion extending from said base portion in transverse relationship thereto through the opening in said cross plate member, said rivet portion being riveted to the top surface of said cross plate member to fill the opening therein and to prevent the passage of water and moisture therethrough while holding the cross plate member and the snap fastener member in assembly, resilient, spaced, leg portions extending from the opposite side of said base portion in transverse relationship thereto and extending through the aperture in said support for holding the fastener element in firm engagement therewith, and a flexible washer surrounding the aperture in the support with one surface thereof in engagement with the under surface of the base portion, and the other surface thereof in engagement with the outside face of the support.

References Cited in the file of this patent

UNITED STATES PATENTS

| | | |
|---|---|---|
| 2,644,213 | Bedford | July 7, 1953 |
| 2,761,347 | McKee | Sept. 4, 1956 |